US008810622B2

(12) United States Patent
Mamiya et al.

(10) Patent No.: US 8,810,622 B2
(45) Date of Patent: Aug. 19, 2014

(54) LIGHT SCANNING APPARATUS HAVING OPTICAL BOX ON WHICH A BEAM SPLITTER IS DISPOSED, AND IMAGE FORMING APPARATUS INCLUDING THE SAME

(71) Applicant: Canon Kabushiki Kaisha, Tokyo (JP)

(72) Inventors: Toshiharu Mamiya, Yokohama (JP); Hiroshi Nakahata, Abiko (JP); Yuta Okada, Moriya (JP); Shinichiro Hosoi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/866,792

(22) Filed: Apr. 19, 2013

(65) Prior Publication Data

US 2013/0286145 A1 Oct. 31, 2013

(30) Foreign Application Priority Data

Apr. 26, 2012 (JP) .................. 2012-100970
Apr. 15, 2013 (JP) .................. 2013-085224

(51) Int. Cl.
*B41J 15/14* (2006.01)
*B41J 27/00* (2006.01)
*G02B 26/12* (2006.01)

(52) U.S. Cl.
CPC .................. *G02B 26/127* (2013.01)
USPC .......................... 347/242; 347/257

(58) Field of Classification Search
USPC .......... 347/231, 236, 237, 241–247, 256–261
See application file for complete search history.

(56) References Cited

U.S. PATENT DOCUMENTS

| 6,664,996 B2* | 12/2003 | Mano ............... 347/236 |
| 7,072,087 B2 | 7/2006 | Nakahata ............ 359/204 |
| 7,298,390 B2 | 11/2007 | Nakahata ............ 347/231 |
| 7,629,992 B2 | 12/2009 | Nakahata ............ 347/243 |
| 7,728,861 B2 | 6/2010 | Nakahata ............ 347/231 |
| 7,760,228 B2 | 7/2010 | Mamiya ............. 347/257 |
| 7,830,576 B2 | 11/2010 | Nakahata ........... 359/201.1 |
| 2012/0081770 A1 | 4/2012 | Sato et al. .......... 359/204.1 |
| 2012/0320140 A1* | 12/2012 | Sakurai ............. 347/224 |

FOREIGN PATENT DOCUMENTS

JP 2006-091157 4/2006

OTHER PUBLICATIONS

U.S. Appl. No. 13/860,383, filed Apr. 10, 2013.
U.S. Appl. No. 13/862,164, filed Apr. 12, 2013.

* cited by examiner

*Primary Examiner* — Hai C Pham
(74) *Attorney, Agent, or Firm* — Fitzpatrick, Cella, Harper & Scinto

(57) ABSTRACT

A light scanning apparatus, including: a light source configured to emit a light beam; a beam splitter configured to split the light beam into a first and a second light beams; a rotary polygon mirror configured to deflect the first light beam to scan a photosensitive member; a motor configured to rotate the rotary polygon mirror; a first lens configured to guide the first light beam to the photosensitive member; an optical sensor configured to receive the second light beam; a second lens configured to condense the second light beam on the optical sensor; and an optical box has a wall standing from a bottom surface between a region in which the rotary polygon mirror and the motor are disposed and a region in which the second lens is disposed, and a height of the wall from the bottom surface is higher than a height of the rotary polygon mirror.

14 Claims, 9 Drawing Sheets

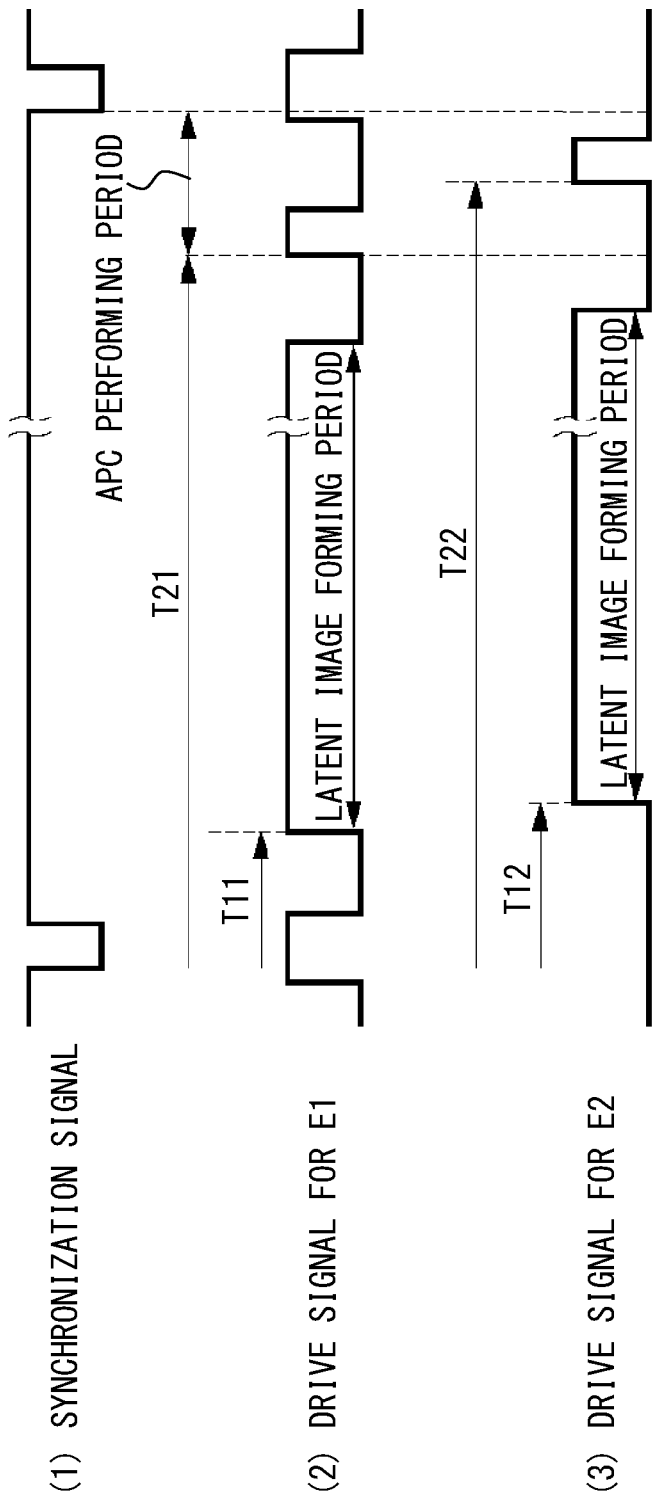

LIGHT SCANNING APPARATUS HAVING OPTICAL BOX ON WHICH A BEAM SPLITTER IS DISPOSED, AND IMAGE FORMING APPARATUS INCLUDING THE SAME

BACKGROUND OF THE INVENTION

1. Field of the Invention

The present invention relates to a light scanning apparatus that emits a light beam and scans a photosensitive member with the emitted light beam and an image forming apparatus including the light scanning apparatus.

2. Description of the Related Art

An electrophotographic image forming apparatus, such as a copier or a printer, forms an image by developing, with toner, an electrostatic latent image formed on a photosensitive member by exposing the photosensitive member with a light beam such as laser light. A light scanning apparatus is employed as an apparatus configured to emit the laser light for scanning and exposing the photosensitive member.

The light scanning apparatus converts a light beam from a light source such as a semiconductor laser into a substantially collimated light beam, and then deflects the collimated light beam with a rotary polygon mirror. The light beam deflected by the rotary polygon mirror scans the photosensitive member in a substantially straight line shape.

In recent years, the light scanning apparatus is configured to expose the photosensitive member with a plurality of laser light beams emitted from a plurality of light emitting points, respectively, in order to support an increased speed of forming an image and an increased resolution of the image. In particular, a vertical cavity surface emitting laser (VCSEL) has been proposed as a light source of the light scanning apparatus owing to the easiness in forming an array of a large number of light emitting points.

In the light scanning apparatus, an optical sensor detects a light intensity of the light beam emitted from the light source, and the light intensity of the light beam emitted from the light source is controlled based on the detected light intensity. Unlike an edge emitting laser, the VCSEL does not have a backside-illumination laser light emitted in a direction opposite to the light beam guided to the photosensitive member. Therefore, in order to control the light intensity of the light beam emitted from the VCSEL, a light scanning apparatus has been proposed, which splits a part of the light beam emitted toward the photosensitive member with a beam splitter, guides one split light beam to the photosensitive member by deflecting the light beam with the rotary polygon mirror, and guides the other split light beam to the optical sensor to detect the light intensity of the light beam (see Japanese Patent Application Laid-Open No. 2006-091157). A ratio of the light intensity of the light beam passing through the beam splitter and guided to the photosensitive member to the light intensity of the light beam guided to the optical sensor is unambiguously determined by a reflectivity of the beam splitter. Therefore, the light intensity of the light beam arriving at the photosensitive member can be controlled to a target light intensity by controlling the light intensity of the light beam emitted from the VCSEL in accordance with the detected light intensity from the optical sensor.

However, when forming an image, a motor that rotates the rotary polygon mirror acts as a heat source, which causes the following problem. That is, when the rotary polygon mirror is rotated, an air flow is generated outward in a radial direction of the rotary polygon mirror. The air flow becomes then a heated air flow due to heat generated by the motor, and this heated air flow is directly blown to the optical sensor and a lens which is disposed between the beam splitter and the optical sensor. This may cause a variation in optical characteristics (such as refractive index) of the lens or a variation of an installation position of the lens due to thermal deformation of the installation position, which may change an optical path of the light beam traveling from the beam splitter to the optical sensor. When an optical sensor having a light receiving area large enough to permit the change of the optical path of the light beam is used to solve this problem, a cost of the optical sensor is increased.

SUMMARY OF THE INVENTION

The present invention provides a light scanning apparatus which suppresses a variation of an optical path of a light beam traveling from a beam splitter to an optical sensor.

The present invention has been made in view of the above-mentioned problem, and according to an embodiment of the present invention, there is provided a light scanning apparatus, including: a light source configured to emit a light beam; a beam splitter configured to split the light beam emitted from the light source into a first light beam and a second light beam; a rotary polygon mirror configured to deflect the first light beam split by the beam splitter to scan a photosensitive member with the first light beam; a motor configured to rotate the rotary polygon mirror; a first lens configured to guide the first light beam deflected by the rotary polygon mirror to the photosensitive member; an optical sensor configured to receive the second light beam reflected by the beam splitter; a second lens disposed on a line segment which connects the beam splitter and the optical sensor on an opposite side of the first lens with respect to the light beam which enters the beam splitter so that the second light beam split by the beam splitter enters the second lens, the second lens being configured to guide the entered second light beam to the optical sensor; and an optical box on which the beam splitter, the first lens, the rotary polygon mirror, the motor, the optical sensor, and the second lens are disposed, wherein the optical box has a wall standing from a bottom surface of the optical box between a region in which the rotary polygon mirror and the motor are disposed and a region in which the second lens is disposed, and a height of the wall from the bottom surface of the optical box is higher than a height from the bottom surface of the optical box to the rotary polygon mirror.

Further features of the present invention will become apparent from the following description of exemplary embodiments with reference to the attached drawings.

BRIEF DESCRIPTION OF THE DRAWINGS

FIG. 5 is a timing chart of illustrating timing for controlling a light intensity.

DESCRIPTION OF THE EMBODIMENTS

Embodiment

Figure 1:
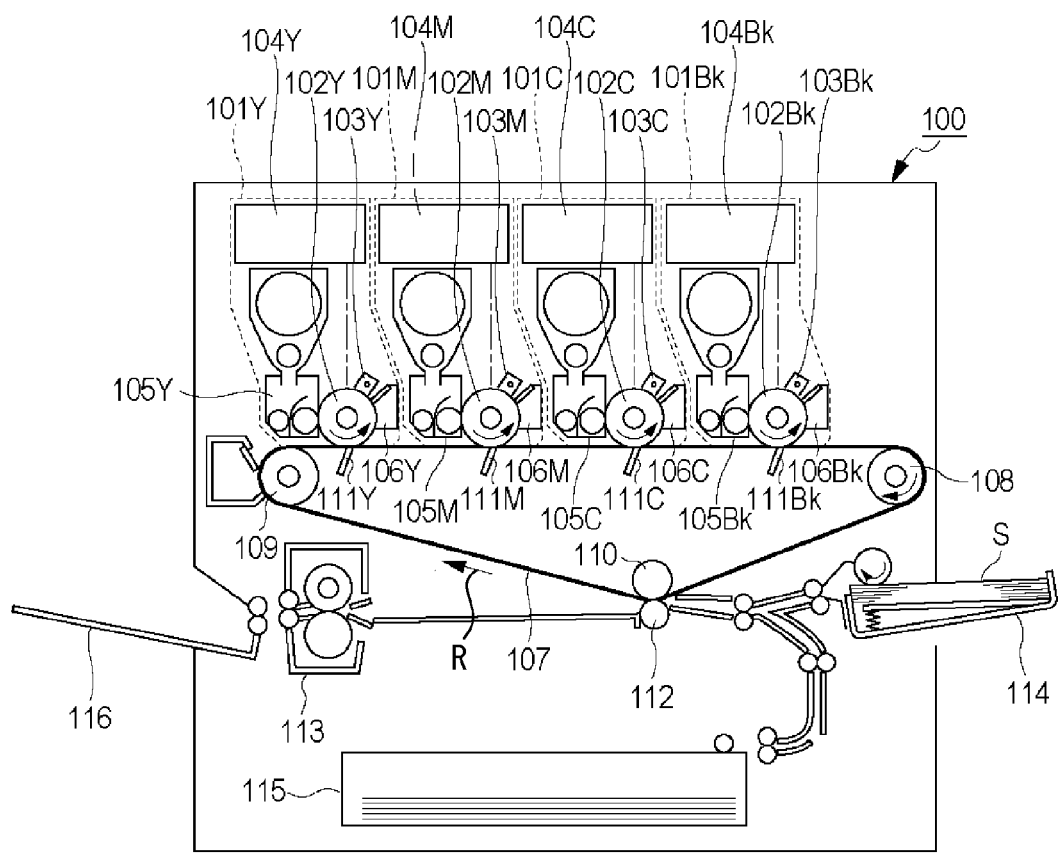
FIG. 1 is a schematic cross-sectional view of a color image forming apparatus.

FIG. 1 is a schematic cross-sectional view of a digital full-color printer (color image forming apparatus) which forms a color image by using a plurality of color toners. FIGS. 2A, 2B, 2C, and 2D are a perspective view, a top view, a cross-sectional view, and a view of illustrating substantial parts of a light scanning apparatus, respectively. The light scanning apparatus is a light beam emitting apparatus provided in the digital full-color printer illustrated in FIG. 1. Although the embodiment will be described by only using a color image forming apparatus and a light scanning apparatus included in the color image forming apparatus as an example, the embodiment is not limited to the color image forming apparatus and the light scanning apparatus included in the color image forming apparatus, but can be also applied to a monochrome image forming apparatus which forms an image by using a monochrome toner (for example, a black toner) and a light scanning apparatus included in the monochrome image forming apparatus.

Firstly, an image forming apparatus 100 according to the embodiment will be described with reference to FIG. 1. The image forming apparatus 100 includes four image forming portions (image forming units) 101Y, 101M, 101C, and 101Bk which form images of different colors, respectively. Suffixes Y, M, C, and Bk represent yellow, magenta, cyan, and black, respectively. That is, the image forming portions 101Y, 101M, 101C, and 101Bk form images by using toners of yellow, magenta, cyan, and black, respectively.

The image forming portions 101Y, 101M, 101C, and 101Bk include photosensitive drums 102Y, 102M, 102C, and 102Bk, respectively, which are photosensitive members. Charging devices 103Y, 103M, 103C, and 103Bk, light scanning apparatuses 104Y, 104M, 104C, and 104Bk, and developing devices 105Y, 105M, 105C, and 105Bk are disposed around the photosensitive drums 102Y, 102M, 102C, and 102Bk, respectively. Drum cleaning devices 106Y, 106M, 106C, and 106Bk are further disposed around the photosensitive drums 102Y, 102M, 102C, and 102Bk.

An intermediate transfer belt 107 of an endless belt type is disposed under the photosensitive drums 102Y, 102M, 102C, and 102Bk. The intermediate transfer belt 107 is passed over a drive roller 108 and driven rollers 109 and 110, and rotates in a direction indicated by an arrow R illustrated in FIG. 1 while forming an image. Further, primary transfer devices 111Y, 111M, 111C, and 111Bk are disposed opposite to the photosensitive drums 102Y, 102M, 102C, and 102Bk, respectively, through the intermediate transfer belt (intermediate transfer member) 107.

The image forming apparatus 100 according to the embodiment further includes a secondary transfer device 112 configured to transfer the toner image on the intermediate transfer belt 107 onto a recording medium S and a fixing device 113 configured to fix the toner image on the recording medium S.

An image forming process from a charging step to a developing step of the image forming apparatus 100 having the above-mentioned configuration will be described. The image forming process is the same in each of the image forming portions, and hence the image forming process in the image forming portion 101Y will be described as a representative example. Accordingly, descriptions of the image forming processes in the image forming portions 101M, 101C, and 101Bk are omitted.

Firstly, the photosensitive drum 102Y that is driven to rotate is charged by the charging device 103Y of the image forming portion 101Y. The charged photosensitive drum (image bearing member) 102Y is exposed by laser light emitted from the light scanning apparatus 104Y. With this operation, an electrostatic latent image is formed on the rotating photosensitive drum 102Y. Thereafter, the electrostatic latent image is developed into a yellow toner image by the developing device 105Y.

The image forming process after the transfer step will hereinafter be described by taking the image forming portions as an example. The primary transfer devices 111Y, 111M, 111C, and 111Bk apply transfer biases to the intermediate transfer belt 107. Thus, the yellow, magenta, cyan, and black toner images formed on the photosensitive drums 102Y, 102M, 102C, and 102Bk of the respective image forming portions, respectively, are transferred onto the intermediate transfer belt 107. With this operation, the toner images of the four colors are superimposed on the intermediate transfer belt 107.

When the toner images of the four colors are transferred onto the intermediate transfer belt 107, the toner images of the four colors transferred onto the intermediate transfer belt 107 are again transferred by the secondary transfer device 112 onto the recording medium S conveyed from a manual sheet feeding cassette 114 or a sheet feeding cassette 115 to a secondary transfer portion T2 (secondary transfer). The toner image transferred onto the recording medium S is then heated and fixed by the fixing device 113, and the recording medium S, on which the toner image is fixed, is delivered to a delivery tray 116. With this operation, a full color image is obtained on the recording medium S.

After the transfer of the images is completed, the drum cleaning devices 106Y, 106M, 106C, and 106Bk remove residual toners from the photosensitive drums 102Y, 102M, 102C, and 102Bk, respectively, and after that, the above-mentioned image forming process is subsequently performed.

Configurations of the light scanning apparatus 104Y, 104M, 104C, and 104Bk will be described with reference to FIGS. 2A to 2D, 3A, 3B, and 7. The light scanning apparatus 104Y, 104M, 104C, and 104Bk have the same configuration, and hence the suffixes Y, M, C, and Bk, which represent respective colors, are omitted in the following description. The light scanning apparatus 104 includes an optical box 201, and various optical members described below are disposed in the optical box 201.

Figure 2A:
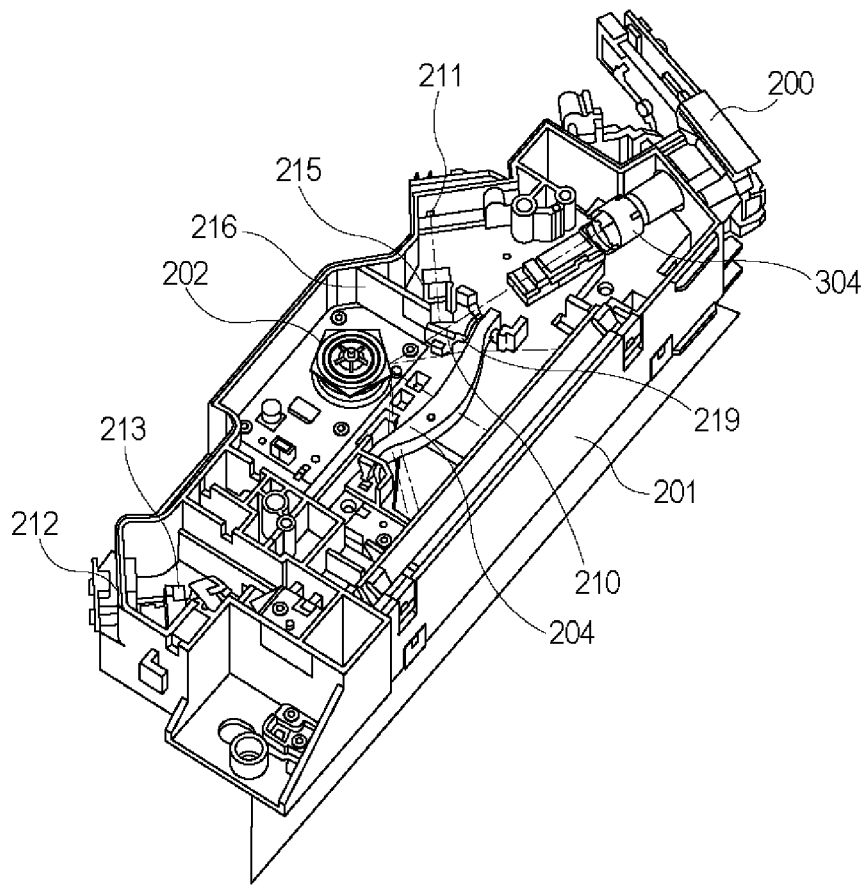
FIG. 2A is a perspective view of a light scanning apparatus.
Figure 2B:
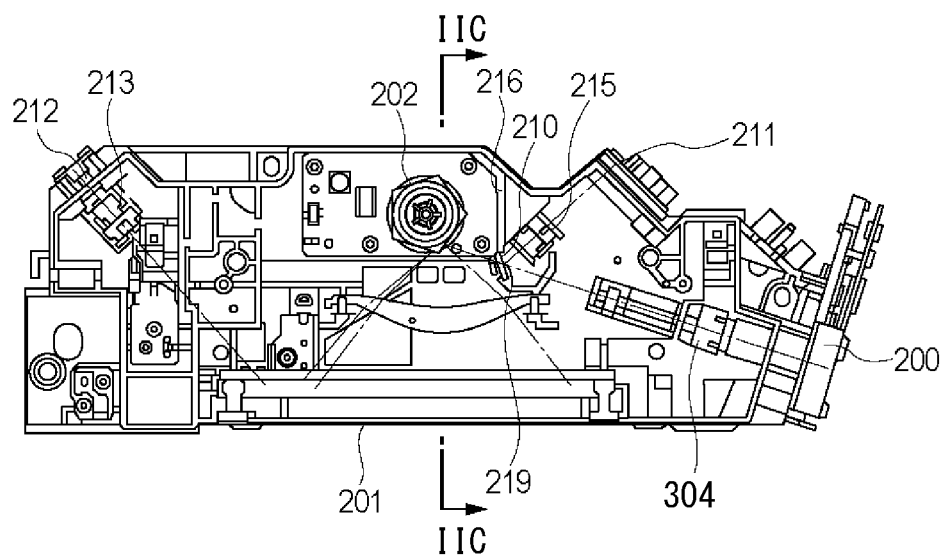
FIG. 2B is a top view of the light scanning apparatus.
Figure 2C:
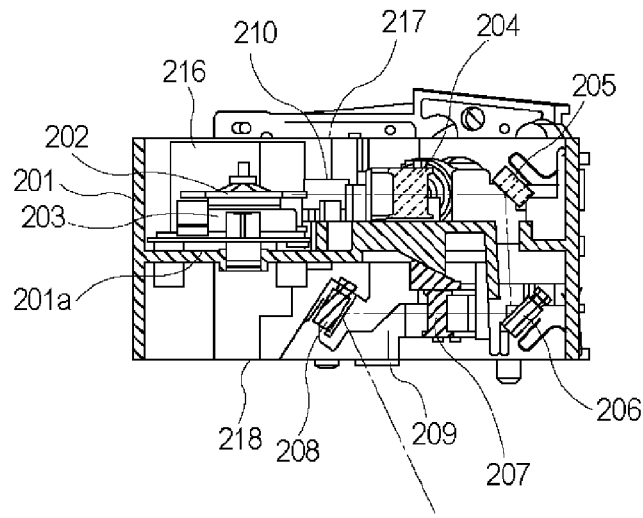
FIG. 2C is a cross-sectional view of the light scanning apparatus taken along the lines IIC-IIC illustrated in FIG. 2B.
Figure 2D:
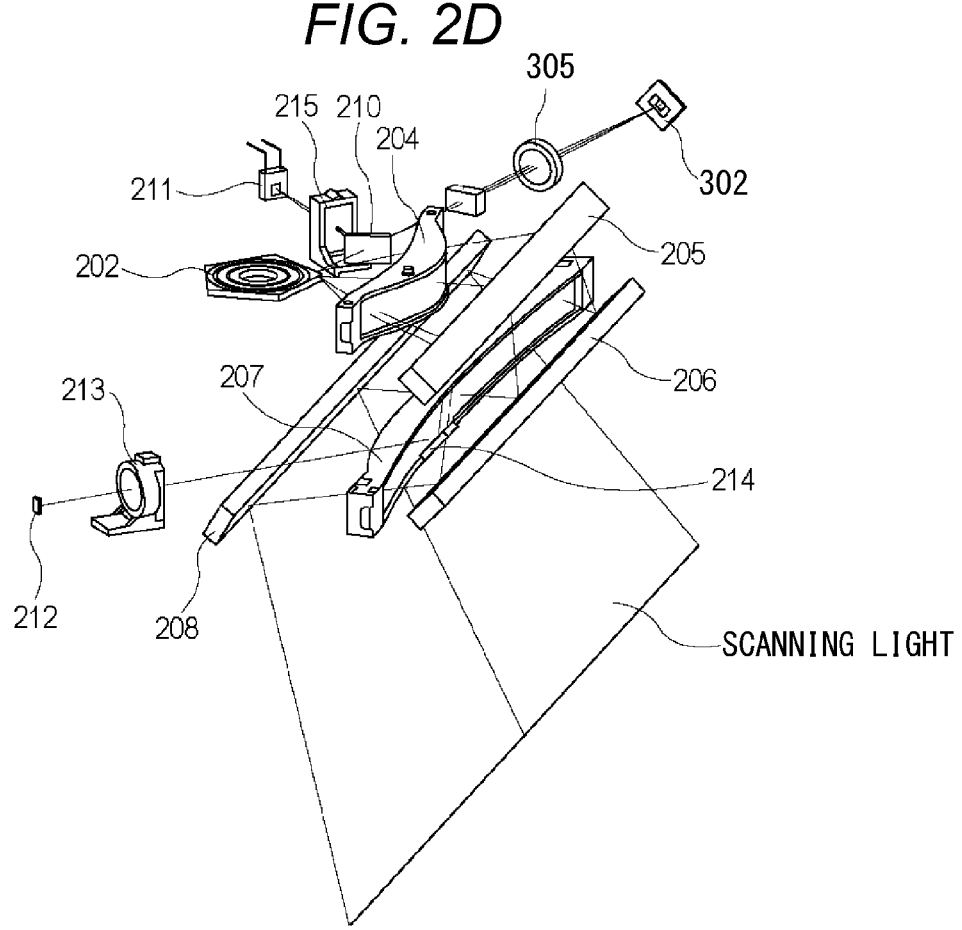
FIG. 2D is a view of illustrating substantial parts of the light scanning apparatus.

FIG. 2A is a perspective view of the light scanning apparatus 104, FIG. 2B is a top view of the light scanning apparatus 104, FIG. 2C is a cross-sectional view of the light scanning apparatus 104 taken along the lines IIC-IIC illustrated in FIG. 2B, and FIG. 2D is a perspective view illustrating configurations of substantial optical components. As illustrated in FIG. 2A, an optical unit 200, which will be described later, is mounted to the optical box 201. A rotary polygon mirror 202, which is a deflector configured to deflect laser light emitted from the optical unit to scan a surface of the photosensitive drum with the laser light in a predetermined direction, is disposed in the optical box 201. The rotary polygon mirror 202 is driven to rotate by a motor 203 illustrated in FIG. 2C. The laser light deflected by the rotary polygon mirror 202 enters a first fθ lens (first lens) 204. The first fθ lens 204 is positioned by a positioning portion 219 disposed on a side of an incident surface which the laser light enters. The laser light which has passed through the first fθ lens 204 is reflected by a reflection mirror 205 and a reflection mirror 206 (see FIGS. 2C and 2D), and enters a second fθ lens 207. The laser light which has passed through the second fθ lens 207 is reflected by a reflection mirror 208, and is guided to the photosensitive drum through a dustproof glass 209. The laser light scanned at a uniform angular velocity by the rotary polygon mirror 202 is imaged on the surface of the photosensitive drum by the first fθ lens 204 and the second fθ lens 207, and thus the surface of the photosensitive drum is scanned at a uniform velocity.

The light scanning apparatus 104 according to the embodiment includes a beam splitter 210 as a light beam splitting device. The beam splitter 210 is disposed on an optical path of the laser light emitted from the optical unit 200 and traveling toward the rotary polygon mirror 202. In the embodiment, the beam splitter 210 is disposed between the optical unit 200 and the rotary polygon mirror 202. The laser light which enters the beam splitter 210 is split into first laser light (first light beam) which is transmitted light and second laser light (second light beam) which is reflected light.

Figure 6A:
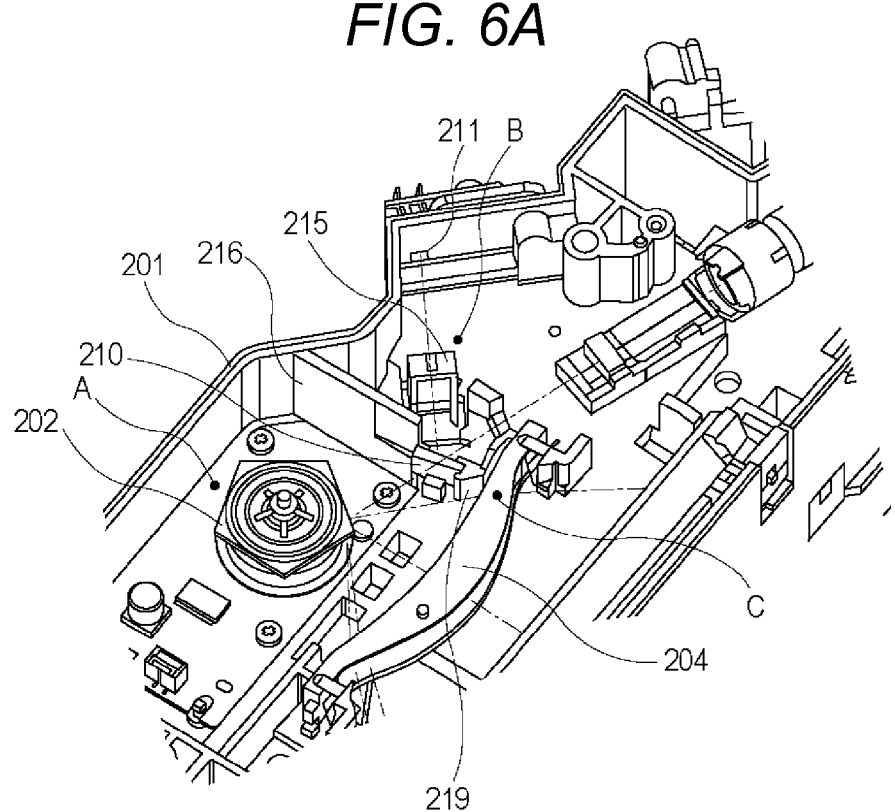
FIG. 6A is a partial enlarged perspective view of the light scanning apparatus.
Figure 6B:
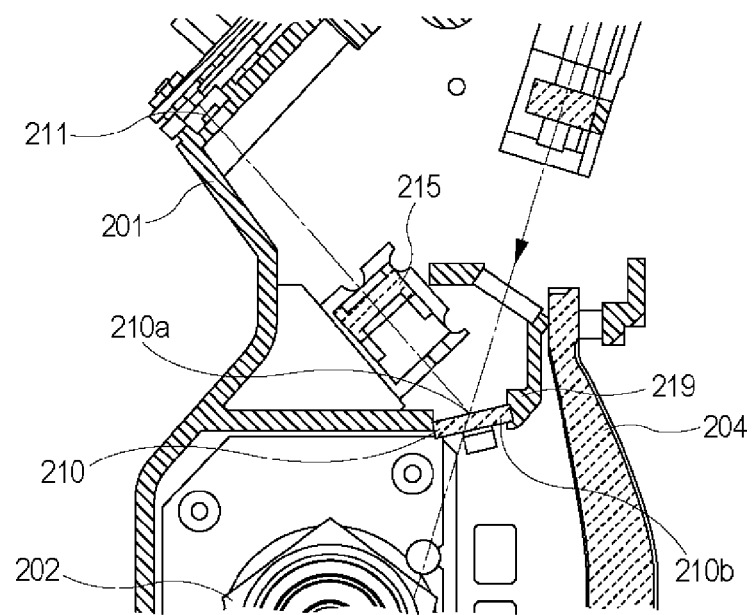
FIG. 6B is a partial enlarged top view of the light scanning apparatus.

FIG. 6A is a partial enlarged perspective view of a portion on which the beam splitter 210 is disposed, and FIG. 6B is a partial enlarged top view of the portion. As illustrated in FIG. 6B, the beam splitter 210 has an incident surface 210a and an exit surface 210b, and a coating (film) is formed on the incident surface 210a to obtain a predetermined reflectivity (transmissivity). The exit surface 210b has a slight angular difference with respect to the incident surface 210a so that, even when an internal reflection occurs, the internally reflected laser light is guided in a direction different from a direction of the second laser light reflected at the incident surface 210a. That is, the incident surface 210a and the exit surface 210b are not parallel to each other. Further, the second laser light reflected at the incident surface 210a of the beam splitter 210 is guided to an opposite side of the first fθ lens 204 with respect to the light beam of the laser light emitted from the optical unit 200 and traveling toward the rotary polygon mirror 202.

The first laser light is deflected by the rotary polygon mirror 202 and guided to the photosensitive drum as described above. The second laser light passes through a condenser lens (second lens) 215 illustrated in FIG. 2A, and then enters a photodiode 211 (hereinafter referred to as "PD 211") which is an optical sensor (light receiving unit). An opening is provided on a side surface of the optical box 201, and the condenser lens 215 is disposed on a line segment which connects the PD 211 and the beam splitter 210. The PD 211 is provided on this opening from outside of the optical box 201. The second laser light which has passed through the condenser lens 215 enters the PD 211 through the opening. There is no reflection mirror on an optical path of the second laser light in order to downsize the light scanning apparatus 104 and to reduce the cost. The PD 211 outputs a detection signal in accordance with a light intensity of the received light, and automatic power control (APC), which will be described later, is performed based on the output detection signal. The PD 211 may be installed inside the optical box 201.

The light scanning apparatus 104 according to the embodiment includes a beam detector 212 (hereinafter referred to as "BD 212") which generates a synchronization signal for determining emission timing of the laser light based on image data on the photosensitive drum. As illustrated in FIG. 2D, the laser light (first laser light) deflected by the rotary polygon mirror 202 passes through the first fθ lens 204, is reflected by the reflection mirror 205 and the reflection mirror 214, and enters the BD 212.

The optical box 201 has a shape having opened surfaces on upper and lower sides as illustrated in FIG. 2C, and hence the optical box 201 is sealed by fixing an upper lid 217 and a lower lid 218 thereto.

Figure 3A:
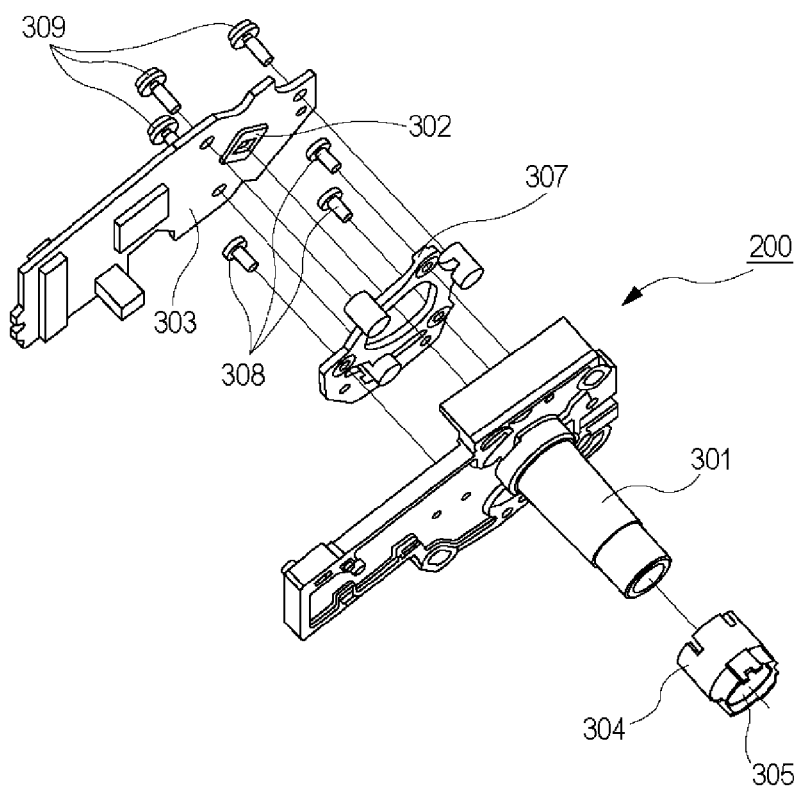
FIGS. 3A and 3B are exploded perspective views of an optical unit.
Figure 3B:
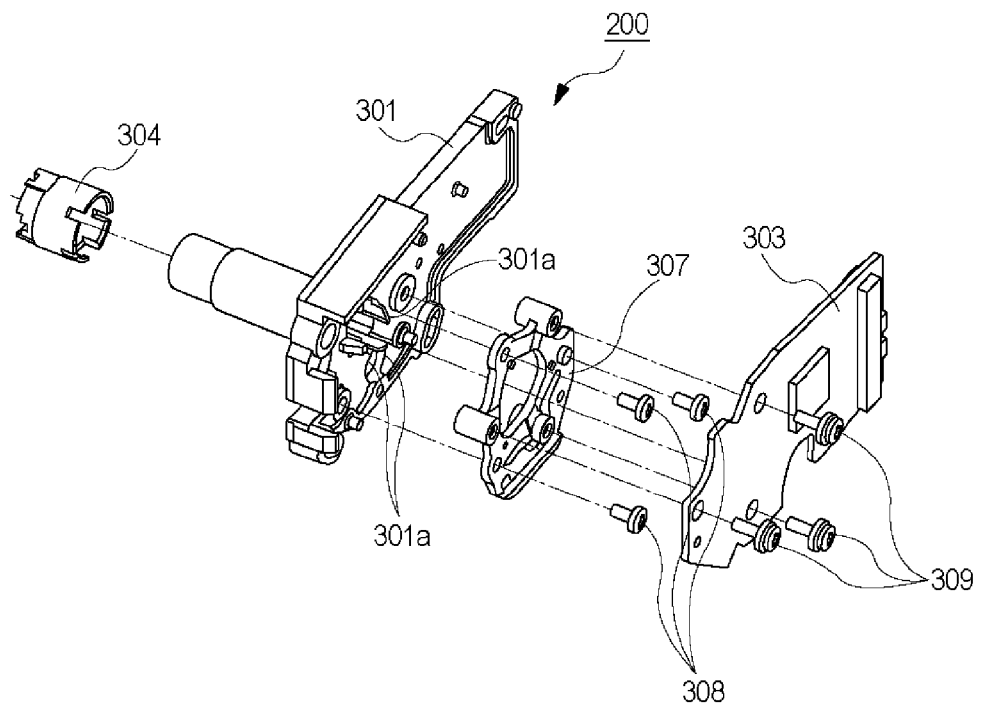

FIGS. 3A and 3B are exploded perspective views of the optical unit 200 mounted on the optical box 201 of the light scanning apparatus 104. FIG. 3A is a perspective view as viewed from a side of a lens barrel which will be described later, and FIG. 3B is a perspective view as viewed from a side of a circuit board which will be described later.

The optical unit 200 includes a semiconductor laser 302 (for example, a vertical cavity surface emitting laser (VCSEL) as a light source configured to emit laser light (light beam), and a printed circuit board 303 (hereinafter referred to as "circuit board 303") configured to drive the semiconductor laser 302. In the following, the semiconductor laser 302 will be described as a VCSEL 302. As illustrated in FIG. 3A, the VCSEL 302 is mounted on the circuit board 303.

A laser holder 301 includes a barrel portion 304, and a collimator lens 305 is mounted on a tip of the barrel portion 304. The collimator lens 305 converts the laser light (diverging light) emitted from the VCSEL 302 into collimated light. A mounting position of the collimator lens 305 is adjusted on the laser holder 301 while detecting an illumination position and a focus of the laser light emitted from the VCSEL 302 by using a specific jig when assembling the light scanning apparatus 104. When the mounting position of the collimator lens 305 is determined, the collimator lens 305 is bonded and fixed to the laser holder 301 by illuminating ultraviolet light on an ultraviolet (UV) cure adhesive applied between the collimator lens 305 and the barrel portion 304. The VCSEL 302 is electrically connected to the circuit board 303, and emits the laser light in response to a drive signal supplied from the circuit board 303.

A method of fixing the circuit board 303, on which the VCSEL 302 is mounted, to the laser holder 301 will be described. A circuit-board support member 307 configured to fix the circuit board 303 to the laser holder 301 illustrated in FIGS. 3A and 3B is made of a material having an elasticity. As illustrated in FIG. 3A, the circuit-board support member 307 includes three screw holes (fixing portions) which are respectively engaged with screws 309, and three openings through which screws 308 extend. The screws 309 respectively extend through holes provided on the circuit board 303 and are respectively engaged with the screw holes provided on the circuit-board support member 307. The screws 308 respectively extend through the openings of the circuit-board support member 307 and are respectively engaged with screw holes provided on the laser holder 301.

When assembling the optical unit 200, firstly, the circuit-board support member 307 is fixed to the laser holder 301 by the screws 308. Subsequently, the VCSEL 302 mounted on the circuit board 303 is pressed against three abutting portions 301a (see FIG. 3B) provided on the laser holder 301. There exists a gap between the circuit-board support member 307 and the circuit board 303. Thereafter, the circuit-board support member 307 is elastically deformed in a shape of an arch convexed toward the laser holder 301 by fastening the screws 309. The circuit board 303 is then pressed against the abutting portions 301a by a restoring force of the circuit-board support member 307 so that the VCSEL 302 is fixed to the laser holder 301.

Figure 4:
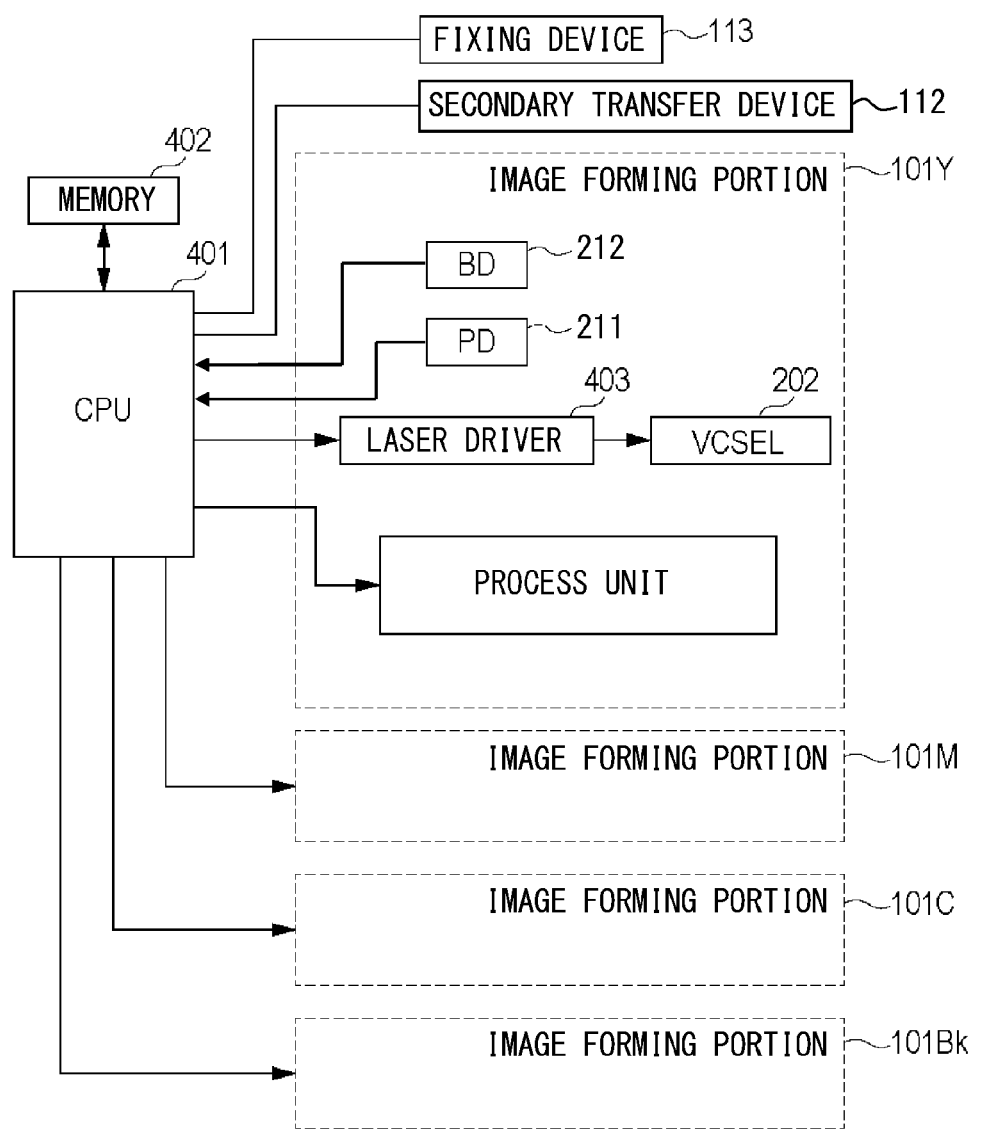
FIG. 4 is a control block diagram of the light scanning apparatus.

FIG. 4 is a control block diagram of the image forming apparatus according to the embodiment. The image forming portion of each color according to the embodiment has the same constituent elements, and hence, in the following, a control block diagram of the image forming portion 101Y will be described as a representative example.

A central processing unit (CPU) 401 is a control portion which causes each element to perform a predetermined control based on a control program stored in a memory 402. A process unit illustrated in FIG. 4 collectively refers to a drive portion configured to drive the photosensitive drum, the charging device 103Y, the developing device 105Y, the drum cleaning device 106Y, the drive roller 108, and the primary transfer device 111Y, and detailed control thereof is omitted from description. Although the CPU 401 further controls the secondary transfer device 112 and the fixing device 113 which fixes the toner image on the recording medium S, detailed control thereof is omitted from description.

The memory 402 stores therein reference value data used when performing the APC and timing data for defining emission timing of each light emitting element, as well as the control program. The CPU 401 includes therein a clock signal generating portion such as a crystal oscillator which generates a clock signal having a frequency higher than that of the synchronization signal, and a counter which counts the clock signal.

The synchronization signal output from the BD 212 is input to the CPU 401. The detection signal output from the PD 211 is further input to the CPU 401. The CPU 401 transmits a control signal to a laser driver 403 based on the synchronization signal, and the laser driver 403 transmits a drive signal to the VCSEL 302 based on the control signal.

In the following, control performed within one scanning period during which the laser light is scanned once in the embodiment will be described with reference to FIG. 5.

In FIG. 5, a signal designated by (1) represents the synchronization signal (BD signal) from the BD 212, a signal designated by (2) represents a drive signal transmitted from the laser driver 403 to a light emitting element E1 among the plurality of light emitting elements of the VCSEL 302, and a signal designated by (3) represents a drive signal transmitted from the laser driver 403 to a light emitting element E2 among the plurality of light emitting elements of the VCSEL 302. Although only the light emitting elements E1 and E2 are described here for ease of description, the number of light emitting elements may be three or more.

As illustrated in (2) of FIG. 5, the laser driver 403 transmits the drive signal to the light emitting element E1 in synchronization with the timing at which the light beam enters the BD 212, in order to generate the synchronization signal. The light emitting element E1 emits the laser light in response to the drive signal, and the BD 212 which receives the laser light generates the synchronization signal.

The CPU 401 determines an exposure start position (image forming start position) in a main scanning direction based on the timing of generating the synchronization signal. The CPU 401 causes the laser driver 403 to start emission of the laser light based on the image data in response to a count value counted in response to the generation of the synchronization signal reaching a first predetermined value (one of the above-mentioned timing data) set corresponding to each light emitting element. That is, as illustrated in (2) and (3) of FIG. 5, the CPU 401 causes the laser driver 403 to start emission of the laser light for forming a toner image on the photosensitive drum after predetermined times T11 (sec) and T12 (sec) corresponding to the first predetermined value since the synchronization signal is generated. The laser light is then emitted from each of the light emitting elements E1 and E2 based on the image data in each of latent image forming periods illustrated in (2) and (3) of FIG. 5. In the light scanning apparatus 104 according to the embodiment, an imaging position of the laser light emitted from the light emitting element E1 and an imaging position of the laser light emitted from the light emitting element E2 are shifted from each other in a scanning direction along which the laser light scans the photosensitive drum (main scanning direction). Therefore, when the time at which the light emitting element E1 emits the laser light based on the image data since the synchronization signal is generated is represented by T11, the light emitting element E2 is designed to emit the laser light later from T11 by (T12-T11).

The CPU 401 resets the count value of the counter in response to the generation of the synchronization signal, and starts counting. The CPU 401 individually causes each light emitting element of the VCSEL 302 to emit the laser light in response to the count value of the counter reaching a second predetermined value (one of the above-mentioned timing data) set correspondingly to each light emitting element, and performs the APC of each light emitting element based on a light receiving result obtained by receiving the laser light emitted from each light emitting element. That is, as illustrated in FIG. 5, the CPU 401 performs the APC after predetermined times T21 (sec) and T22 (sec) corresponding to the second predetermined value since the synchronization signal is generated. The APC is performed during an APC performing period illustrated in FIG. 5.

The first predetermined value and the second predetermined value set correspondingly to each light emitting element are set based on timing at which the laser light scanned by the rotary polygon mirror enters each of the BD 212 and the PD 211, considering a rotation speed of the rotary polygon mirror.

The CPU 401 compares a voltage of the detection signal output from the PD 211 with a reference voltage (corresponding to the reference data stored in the memory 402) corresponding to a target light intensity, and controls a drive current value which is the drive signal supplied to each light emitting element based on a difference of voltage. That is, when the voltage of the detection signal output from the PD 211 is lower than the voltage corresponding to the target light intensity, the CPU 401 increases the drive current supplied from the laser driver 403 to the light emitting element to increase the light intensity of the laser light. On the other hand, when the voltage of the detection signal output from the PD 211 is higher than the voltage corresponding to the target light intensity, the CPU 401 decreases the drive current supplied from the laser driver 403 to the light emitting element, to thereby decrease the light intensity of the laser light.

Features of the light scanning apparatus 104 according to the embodiment will be described with reference to FIGS. 2C, 6A, and 6B. When the rotary polygon mirror 202 is rotated, the motor 203 generates heat. Further, when the rotary polygon mirror 202 is rotated, an air flow is generated outward in the radial direction of the rotary polygon mirror 202. When the heated air flow is directly blown to the condenser lens 215 and the PD 211, the optical characteristics (refractive index and the like) and the mounting position of the condenser lens 215 are changed, and the optical-electrical conversion characteristic of the PD 211 is changed.

When the optical path of the second laser light is changed due to the changes of the optical characteristics and the mounting position of the condenser lens 215, the laser light is deviated from a light receiving area of the PD 211. When the PD 211 having a large light receiving area is used in order that the laser light is certainly imaged on the light receiving area of the PD 211, the manufacturing cost is increased. Further, when the laser light is deviated from the light receiving area of the PD 211, even when the light intensity of the laser light emitted from the light emitting element of the VCSEL 302 is proper, the CPU 401 performs control to increase the light intensity of the light emitting element of the VCSEL 302 because the light intensity of the second laser light which enters the PD 211 is decreased. In addition, when the temperature of the PD 211 is increased, an internal resistance of the PD 211 may be changed so that an output value from the PD 211 to the CPU 401 may be deviated from a true value.

To cope with this problem, as illustrated in FIG. 6A, the optical box 201 includes a wall 216 which stands from the bottom surface of the optical box 201 between a region in which the rotary polygon mirror 202 is disposed and a region in which the condenser lens 215 is disposed. The wall 216 is a member which is formed integrally with the optical box 201 when molding the optical box 201. The wall 216 extends from an outer wall (side wall) of the optical box 201 toward the inside of the optical box 201, and stands between a region A in which the rotary polygon mirror 202 and the motor 203 are disposed and a region B in which the condenser lens 215 and the PD 211 (the opening of the side wall) are disposed. As illustrated in FIG. 2C, a position of an upper edge of the wall 216 (height of the wall 216 from the bottom surface of the optical box 201) is higher than those of upper edges of the plurality of reflection surfaces of the rotary polygon mirror 202. That is, the wall 216 standing from the bottom surface of the optical box 201 is disposed opposite to at least one of the reflection surfaces of the rotary polygon mirror 202. The reflection surface of the rotary polygon mirror 202 opposing the wall 216 differs depending on a rotation phase of the rotary polygon mirror 202. Further, the upper edge of the wall 216 is higher than an upper edge of the condenser lens 215 (height of the condenser lens 215 from the bottom surface of the optical box 201). In addition, a position of an upper edge of the beam splitter 210 (height of the beam splitter 210 from the bottom surface of the optical box 201) is also higher than the positions of the upper edges of the plurality of reflection surfaces of the rotary polygon mirror 202. With this configuration, the heated air flow containing the heat generated by the rotation of the rotary polygon mirror 202 can be prevented from being directly blown to the condenser lens 215 and the PD 211. The "bottom surface of the optical box 201", which works as a reference of the above-mentioned heights, is a surface 201a illustrated in FIG. 2C. In addition, because the wall 216 stands from the bottom surface, the wall 216 also serves as a strengthening portion (strengthening rib) configured to strengthen the optical box 201. The wall 216 may be a separate member from the optical box 201.

Further, in a direction parallel to the bottom surface of the optical box 201, the beam splitter 210 is disposed in a position adjacent to the wall 216, and one end of the beam splitter 210 and an end portion of the wall 216 are brought into contact with each other in the height direction of the optical box 201. With this configuration, the wall 216 and the beam splitter 210 separate the region in which the rotary polygon mirror 202 is disposed from the region in which the condenser lens 215 and the PD 211 are disposed, and the above-mentioned air flow can be blocked by the wall 216 and the beam splitter 210, and as a result, the influence of the heated air flow on the condenser lens 215 and the PD 211 can be reduced. In addition, in the direction parallel to the bottom surface of the optical box 201, the other end of the beam splitter 210 and the positioning portion 219 of the first fθ lens 204 are brought into contact with each other in the height direction of the optical box 201 as illustrated in FIG. 6B, and hence the region A and the region B are isolated from each other at a position of the height of the plurality of reflection surface of the rotary polygon mirror 202.

Figure 7:
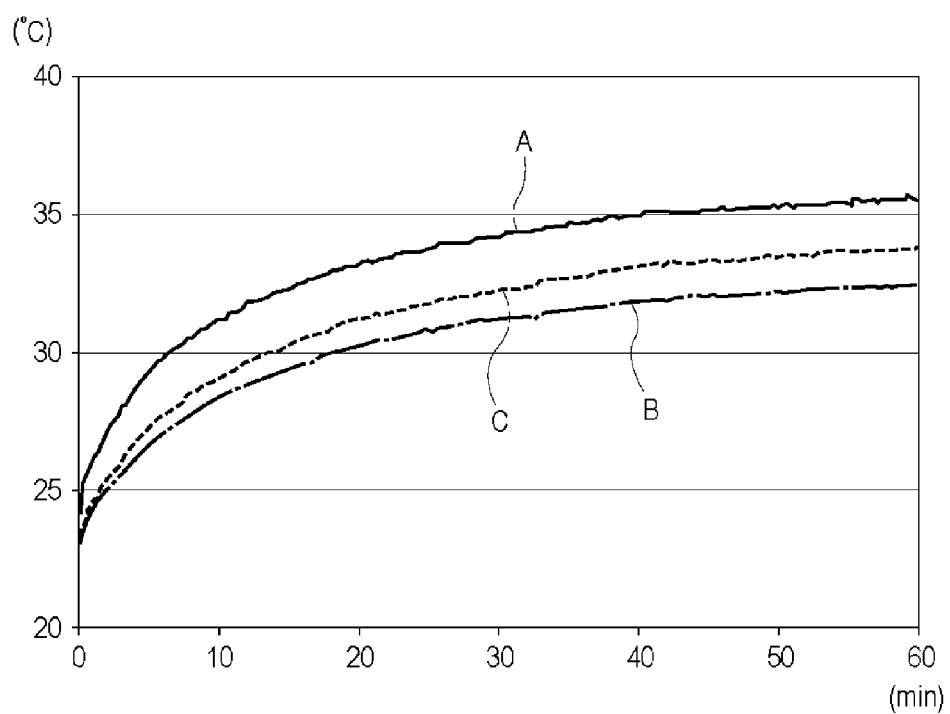
FIG. 7 is a graph showing temperature changes in regions A, B, and C in an optical box.

An effect of the wall 216 will be described with reference to FIG. 7. FIG. 7 is a graph showing temperature changes of the region A, the region B, and a region C when the rotary polygon mirror 202 is continuously rotated. The vertical axis represents temperature (° C.), and the horizontal axis represents time (min). The region C represents a point on the first fθ lens 204 to which the air flow from the rotary polygon mirror 202 is directly blown, which will be described as a target for comparison. It is found that, compared to the temperature change of the region C indicated by a short dashes line, the temperature of the region B indicated by a dot and dash line is suppressed due to the presence of the wall 216.

Figure 8:
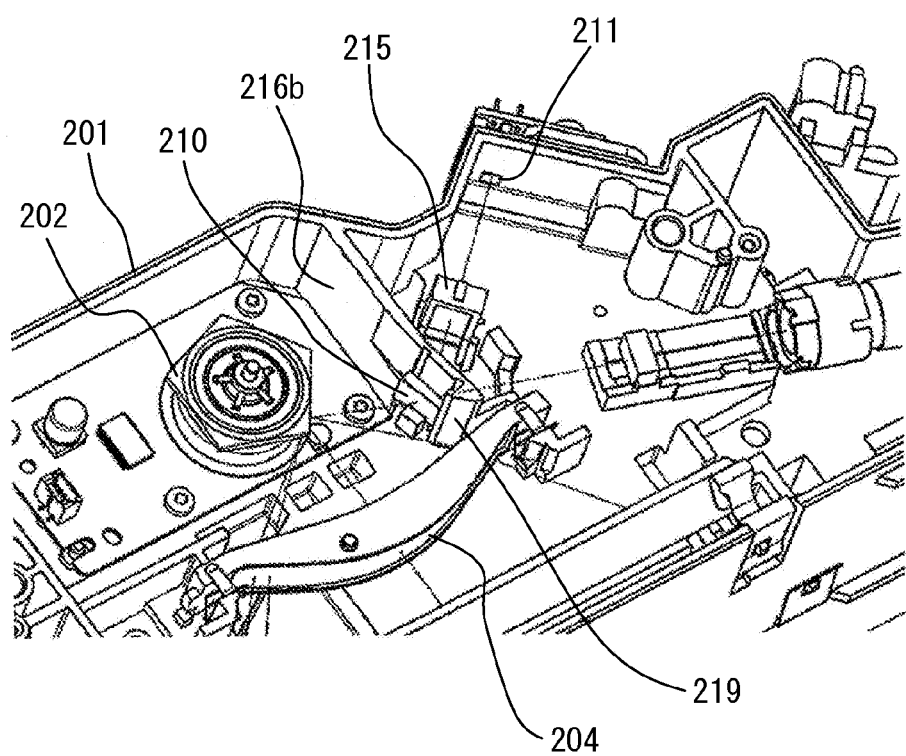
FIG. 8 is a partial enlarged perspective view of a light scanning apparatus according to a modification example.

In the embodiment described above, the wall 216 of the optical box 201 is set higher than the condenser lens 215 across a range from the outer wall to the end surface of the beam splitter 210, and the portion of the beam splitter 210 is lower than the wall 216. However, as illustrated in FIG. 8, an opening portion (not shown) configured to mount the beam splitter 210 may be provided on a wall 216b so that the wall 216b is connected to the positioning portion 219 of the first fθ lens 204. That is, the wall 216b may work as a connecting portion that connects the side wall of the optical box 201 and the positioning portion 219. In this case, the wall 216b is also provided on the upper side of the beam splitter 210.

Further, the temperature rise of the region B can be further suppressed when the wall 216 or 216b is brought into contact with the upper lid 217. At this time, when the motor 203 which is a heat source is completely surrounded, the heat is accumulated so that the optical box 201 may be deformed due to a local temperature rise. For this reason, it is desired to secure an appropriate space between the upper lid 217 and an opposite portion of the beam splitter 210 or the upper portion of the first fθ lens 204 with respect to the rotary polygon mirror 202 of the optical box 201.

In addition, in the embodiment, the wall 216 is provided between the rotary polygon mirror 202 and the condenser lens 215, but there is no wall provided between the rotary polygon mirror 202 and the first fθ lens 204. The heated air flow is not blown to the region B in which the condenser lens 215 is disposed, due to the wall 216. Therefore, the temperature of the rotary polygon mirror 202 may rise, which may deform the portion of the region A of the optical box 201. However, the light scanning apparatus 104 according to the embodiment opens between the rotary polygon mirror 202 and the first fθ lens 204 so that the heated air flow generated by the rotation of the rotary polygon mirror 202 is blown toward the first fθ lens 204.

As described above, the heated air flow can be prevented from being directly blown to the condenser lens 215 by providing the wall 216 or 216b between the region in which the rotary polygon mirror 202 and the motor 203 are disposed and the region in which the condenser lens 215 is disposed. With this configuration, the APC can be performed even during a continuous image forming operation.

According to the embodiment, because the wall having the height from the bottom surface of the optical box higher than the height of the rotary polygon mirror is provided between the region in which the rotary polygon mirror and the motor are disposed and the region in which the lens is disposed, a change of the optical path of the light beam traveling from the beam splitter toward the optical sensor can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-100970, filed Apr. 26, 2012, and 2013-085224, filed Apr. 15, 2013, which are hereby incorporated by reference herein in their entirety.

What is claimed is:

1. A light scanning apparatus, comprising:
a light source configured to emit a light beam;
a beam splitter configured to split the light beam emitted from the light source into a first light beam and a second light beam;
a rotary polygon mirror configured to deflect the first light beam split by the beam splitter to scan a photosensitive member with the first light beam;
a motor configured to rotate the rotary polygon mirror;
a first lens configured to guide the first light beam deflected by the rotary polygon mirror to the photosensitive member;
an optical sensor configured to receive the second light beam reflected by the beam splitter;
a second lens disposed on a line segment which connects the beam splitter and the optical sensor on an opposite side of the first lens with respect to the light beam which enters the beam splitter so that the second light beam split by the beam splitter enters the second lens, the second lens being configured to guide the entered second light beam to the optical sensor; and
an optical box on which the beam splitter, the first lens, the rotary polygon mirror, the motor, the optical sensor, and the second lens are disposed,
wherein the optical box comprises a wall standing from a bottom surface of the optical box between a region in which the rotary polygon mirror and the motor are disposed and a region in which the second lens is disposed,
wherein a height of the wall from the bottom surface of the optical box is higher than a height from the bottom surface of the optical box to the rotary polygon mirror,
wherein the beam splitter is mounted on the bottom surface of the optical box,
wherein one end of the beam splitter in a direction parallel to the bottom surface is disposed in a position adjacent to the wall and in contact with the wall, and
wherein the wall and the beam splitter separate the region in which the second lens is disposed from the region in which the rotary polygon mirror and the motor are disposed.

2. A light scanning apparatus according to claim 1, wherein the wall comprises a member configured to prevent an air flow generated by rotation of the rotary polygon mirror from directly blowing toward the second lens.

3. A light scanning apparatus according to claim 1, wherein the optical box comprises a positioning portion standing from the optical box and configured to position the first lens on a side of the incident surface of the first lens which the first light beam deflected by the rotary polygon mirror enters, and
another end of the beam splitter in the direction parallel to the bottom surface is in contact with the positioning portion in a height direction from the bottom surface.

4. A light scanning apparatus according to claim 3, wherein the wall comprises a connecting portion located on an upper side of the beam splitter in the height direction from the bottom surface of the optical box and connecting the wall and the positioning portion.

5. A light scanning apparatus according to claim 1, wherein the wall extends from a side wall of the optical box toward an inside of the optical box.

6. A light scanning apparatus according to claim 1, further comprising a control portion configured to control a light intensity of the light beam emitted from the light source based on a light intensity of the second light beam received by the optical sensor.

7. An image forming apparatus, comprising:
the light scanning apparatus as recited in claim 1;
the photosensitive member;
a developing device configured to develop, with toner, an electrostatic latent image formed on the photosensitive member by exposing the photosensitive member with the first light beam;
a transfer device configured to transfer a toner image developed on the photosensitive member onto a recording medium; and
a control portion configured to control a light intensity of the light beam emitted from the light source based on a light intensity of the second light beam received by the optical sensor.

8. A light scanning apparatus, compromising:
a light source configured to emit a light beam;
a beam splitter configured to split the light beam emitted from the light source into a first light beam and a second light beam;
a rotary polygon mirror configured to deflect the first light beam split by the beam splitter to scan a photosensitive member with the first light beam;
a motor configured to rotate the rotary polygon mirror;
a first lens configured to guide the first light beam deflected by the rotary polygon mirror to the photosensitive member;
an optical sensor which the second light beam reflected by the beam splitter enters;
a second lens disposed on a line segment which connects the beam splitter and the optical sensor on an opposite side of the first lens with respect to the light beam which is emitted from the light source and enters the beam splitter so that the second light beam split by the beam splitter enters the second lens, the second lens being configured to guide the entered second light beam to the optical sensor; and
an optical box on which the beam splitter, the first lens, the rotary polygon mirror, the motor, the optical sensor, and the second lens are disposed,
wherein the optical box comprises a wall standing from a bottom surface of the optical box between a region in which the rotary polygon mirror and the motor are disposed and a region in which the second lens is disposed, the wall being disposed opposite to a reflection surface of the rotary polygon mirror,
wherein the beam splitter is mounted on the bottom surface of the optical box,
wherein one end of the beam splitter in a direction parallel to the bottom surface is disposed in a position adjacent to the wall and in contact with the wall, and
wherein the wall and the beam splitter separate the region in which the second lens is disposed from the region in which the rotary polygon mirror and the motor are disposed.

9. A light scanning apparatus according to claim 8, wherein the wall comprises a member configured to prevent an air flow generated by rotation of the rotary polygon mirror from directly blowing toward the second lens.

10. A light scanning apparatus according to claim 8, wherein the optical box comprises a positioning portion standing from the optical box and configured to position the first lens on a side of an incident surface of the first lens which the first light beam deflected by the rotary polygon mirror enters, and another end of the beam splitter in the direction parallel to the bottom surface is in contact with the positioning portion in a height direction from the bottom surface.

11. A light scanning apparatus according to claim 10, wherein the wall comprises a connecting portion located on an upper side of the beam splitter in the height direction from the bottom surface of the optical box and connecting the wall and the positioning portion.

12. A light scanning apparatus according to claim 8, wherein the wall extends from a side wall of the optical box toward an inside of the optical box.

13. A light scanning apparatus according to claim 8, further comprising a control portion configured to control a light intensity of the light beam emitted from the light source based on a light intensity of the second light beam received by the optical sensor.

14. An image forming apparatus, comprising:

the light scanning apparatus as recited in claim 8;

the photosensitive member;

a developing device configured to develop, with toner, an electrostatic latent image formed on the photosensitive member by exposing the photosensitive member with the first light beam;

a transfer device configured to transfer a toner image developed on the photosensitive member onto a recording medium; and a control portion configured to control a light intensity of the light beam emitted from the light source based on a light intensity of the second light beam received by the optical sensor.

* * * * *